April 11, 1961  E. G. OVERLY  2,978,944
ADJUSTABLE WORK SUPPORT USABLE WITH DIE CUTTING PRESS
Filed April 11, 1958  2 Sheets-Sheet 1
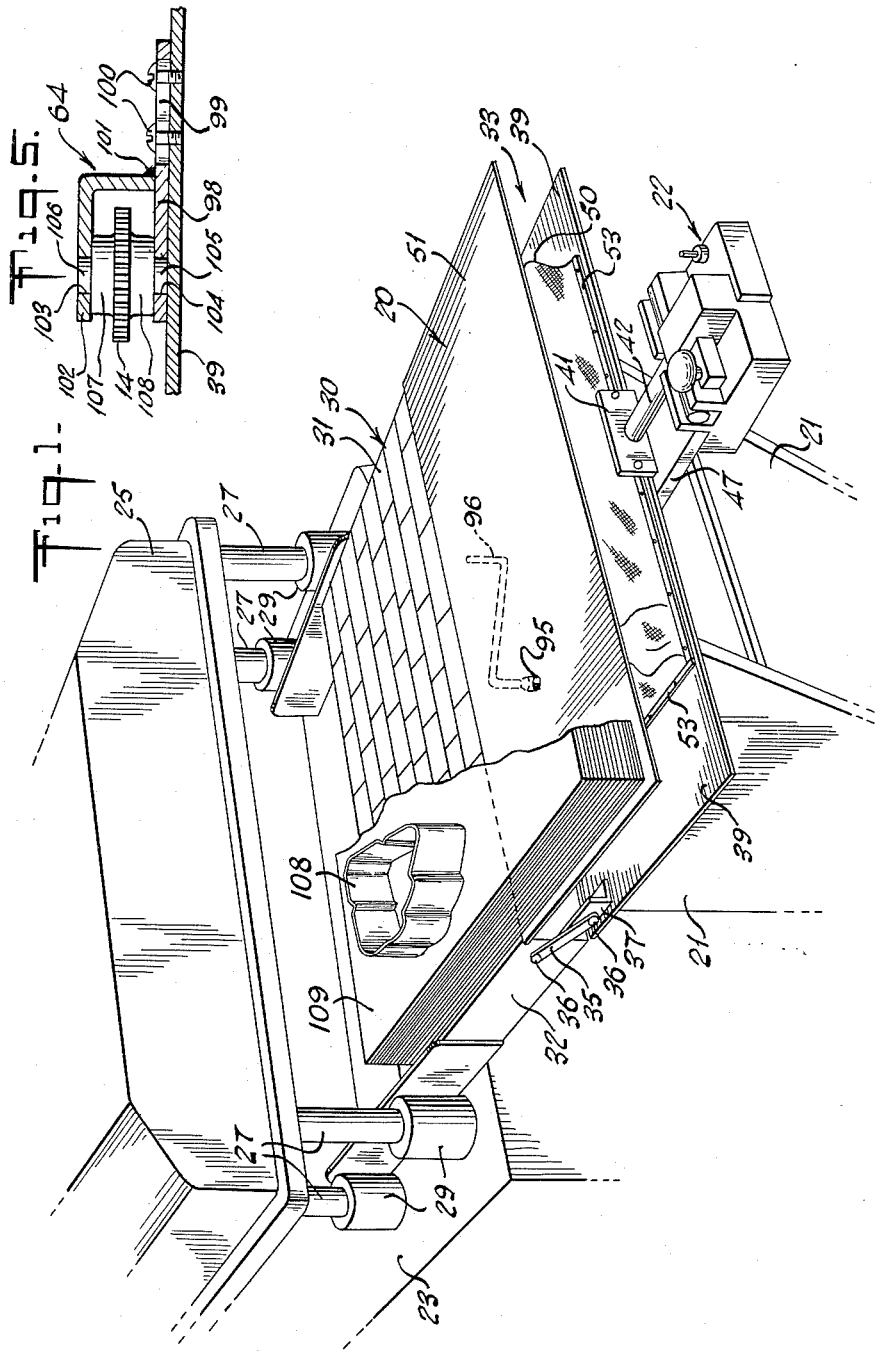
INVENTOR
ELMER G. OVERLY
BY
Moses, Nolte, & Nolte
ATTORNEYS April 11, 1961   E. G. OVERLY   2,978,944
ADJUSTABLE WORK SUPPORT USABLE WITH DIE CUTTING PRESS
Filed April 11, 1958   2 Sheets-Sheet 2
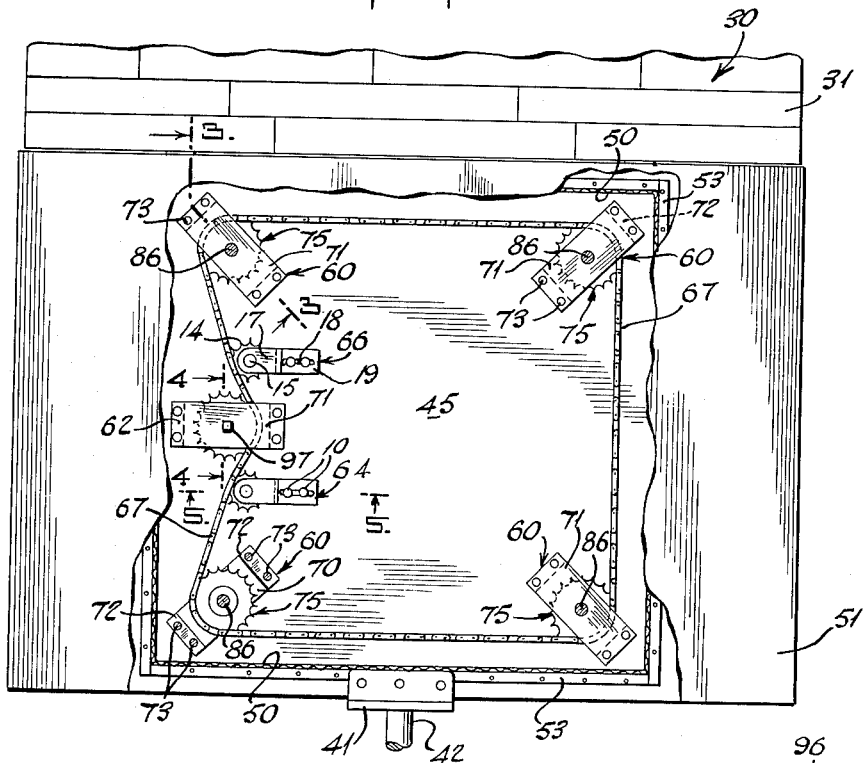
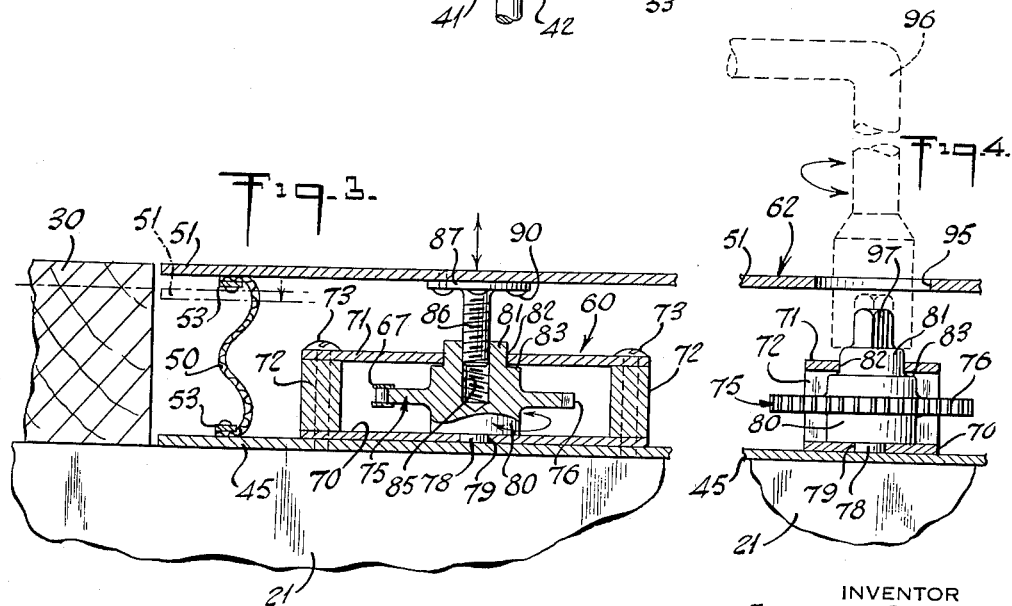
INVENTOR
ELMER G. OVERLY
BY
Moses, Nolte, & Nolte
ATTORNEYS United States Patent Office 2,978,944
Patented Apr. 11, 1961

2,978,944
ADJUSTABLE WORK SUPPORT USABLE WITH DIE CUTTING PRESS

Elmer G. Overly, 7301 Penn Ave., Pittsburgh 8, Pa.

Filed Apr. 11, 1958, Ser. No. 727,891

7 Claims. (Cl. 83—539)

This invention relates to paper processing machinery and more particularly to a new and useful die press cutting board or table for supporting a ream of paper, or similar sheet material, such as may be used in the manufacture of paper envelopes and the like.

The die cutting presses, of the kind to which the present invention pertains, include a movable cutting board table for supporting a ream of paper to be cut by a reciprocating head or hydraulic ram. The cutting board is provided with a portion made of hard wood blocks to permit a cutting die which is forced through the ream to completely penetrate the ream and partially enter into the hard wood cutting board, to assure complete cutting of all of the paper.

In such die presses, the cutting board is usually a composite block made of a multiplicity of hard wood sections. This cutting board is movable into operating position, under the ram of the press, or outwardly from under the ram to an inoperative position; in which latter position, the paper, or other material to be cut, may be placed on the board.

Ordinarily, materials to be cut are originally in large sheets. These large sheets require a suitable working table top having a relatively large area to support them. However, it is possible to do most of the actual cutting on one portion of the cutting board. Usually the work pieces to be cut are quite small in relation to the area of the material from which they are cut. In conventional operation, most of the cutting is done at one end of the table. Consequently, one end of the cutting board, after repeated use, will be badly mutilated and become unusable, due to the action of the die cutter. When this undesirable condition exists, the press operator frequently will rotate the cutting board end-for-end in the same plane, so that the end having the mutilated surface now will be used merely as a support for the ream of paper, while the end of the cutting board with the new cutting surface will be moved under the ram for the actual die cutting operation. After the cutting surface of both ends of the cutting board have become unusable, the cutting board must be replaced with a different board while the board with the unusable cutting surface undergoes a resurfacing operation to reduce sufficiently the mutilated surface until the cutting board again has a surface suitable for die cutting purposes.

Changing the conventional size cutting board is a task not relished by the die press operator since the cutting board is cumbersome to handle and quite heavy. Consequently, the cutting board frequently is permitted to remain on the die press in service appreciably past the time for efficient and economical cutting operations. By employing a smaller cutting board, the die cutting press operator will be more inclined to change the cutting board when necessary, thereby increasing the efficiency of operation and reducing the spoilage of material. Further, since the initial costs of the large cutting boards as well as the resurfacing operation costs thereof are expensive, it is desirable to keep this expense at a minimum. In accordance with this invention the size of the cutting board is reduced, yet a positionable work supporting surface having the efficiency of a larger cutting board is provided.

It is an object of the present invention to provide a novel working surface or work table top arrangement usable in a die cutting press.

A further object of the invention is to provide a novel table arrangement having a fixed height portion and an adjustable height portion.

A further object is to provide a novel table top work-elevating means for a table top portion wherein an end-so that said portion may be lowered to accommodate the remaining portion of the table as it is cut down by resurfacing thereof.

A further object of the invention is to provide a die cutting press having a positionable table and adjustment means for adjusting the height of one portion of the table by novel elevating means.

A further object of the invention is to provide novel elevating means for a table top portion wherein an endless link chain is employed for operating a multiplicity of sprockets which raise and lower the table.

Other objects may become apparent from a perusal of the specification and drawings herein. It is to be understood that the present drawings are by way of illustration and that changes and modifications may be made herein without departing from the spirit of the sub-joined claims.

In the drawings:

Fig. 1 is a perspective view, partially broken away, of the positionable table having the cutting board portion disposed relative to the base and ram of a hydraulic die-cutting press;

Fig. 2 is a plan view of a portion of the table with the adjustable top of the table removed to expose the elevating mechanism for the adjustable table top;

Fig. 3 is a sectional view taken along line 3—3 of Fig. 2 showing a sprocket movably mounted on the table base plate and having a stud engageable therewith for elevating the table adjustable top;

Fig. 4 is a sectional view taken along line 4—4 of Fig. 2 showing a socket wrench arrangement for revolving the table top elevating sprocket; and Fig. 5 is a sectional view of a take-up assembly taken along line 5—5 of Fig. 2.

Referring to the drawings and more particularly to Fig. 1, there is shown a novel table 20 slidable on table top supporting brackets 21 by a carriage mechanism generally designated 22. The table 20 is movable into an operating position onto a base 23 below a reciprocating ram 25 by the carriage mechanism 22. The ram 25 is mounted for vertical reciprocation on guide rods 27 which extend into associated bosses 29 secured to the base 23.

The table 20 has a cutting board portion generally designated 30, formed by a multiplicity of hard wood blocks 31. A metallic band, or wood strip, 32 is arranged along each of the sides of the cutting board portion. A table adjustable portion generally designated 33 is movably held adjacent the cutting board portion 30 by straps 35 on either side thereof. The straps 35 are secured by bolts threaded respectively, into the cutting board portion 30, and into respective angle bars 37, secured to a table base plate 39. With this arrangement, the cutting board portion 30 and the table adjustable portion 33 are combined to move as a unit into and out of an operative position on the base 23, beneath the ram 25, under the influence of the carriage mechanism 22.

The carriage mechanism 22 has a pusher plate 41 secured to a shaft 42 for engaging the table base plate 39, and includes an actuating arm 47 for moving the shaft 42, and the entire carriage mechanism assembly, inwardly, so that the table adjustable portion 33 may be moved into operative position in a conventional manner. Means connecting the table 33 with the actuating arm are not shown herein, but are associated with the conventional carriage mechanism and associated die press equipment for proper positionable movement of the table.

A flexible closure 50 of a material such as rubber, canvas, or the like, is disposed about the complete elevating mechanism carried between an adjustable table top 51 and the table base plate 39. A multiplicity of closure-securing strips 53 are used to grip the free edge of the flexible closure on the four sides thereof and secure same to the table base plate. Equivalent closure-securing strips are used for securing the flexible closure material to the underneath surface of the adjustable table top. The flexible closure prevents dust and foreign material from getting into the operating mechanism of the elevating mechanism.

Referring to Figs. 2, 3, 4 and 5, there are details of the adjustable table top elevating structure wherein elevating sprocket assemblies such as 60 are secured adjacent the four different corners of the table base plate 39. A control sprocket assembly 62 for operating the link chain is disposed between two elevating sprocket assemblies 60 and take-up sprocket assemblies 64 and 66 are disposed on either side of the control sprocket assembly. A continuous link chain 67 goes completely around the four elevating sprockets in the overall elevating sprocket assembly. The take-up sprocket assemblies 64 and 66 are slidably adjustable so that they engage and may control the tension on the endless link chain 67.

Referring to Fig. 3, there is shown a cross section of one elevating sprocket assembly such as 60. Each sprocket assembly has a lower plate 70, an upper plate 71 and spacers 72, between said plates at the corners thereof, for spacing and securing the upper and lower plates with the spacers to the table base plate 39 by means of screws such as 73.

A sprocket wheel, generally designated 75, has spaced sprocket teeth 76 distributed in a conventional manner for engaging the endless link chain 67, and has a lower hub 78 which engages a bearing opening 79 formed in the lower plate 70. A lower shoulder 80 of the sprocket wheel 75 rides against the inner surface of the lower plate 70. The bearing hub 81 on the opposite end of the sprocket rides in a bearing opening 82 formed in the upper plate 71. A hub shoulder 83 adjacent the hub 81 rides on the inner surface of the upper plate 71. A sprocket thread 85 is formed internally of the sprocket 75 to accommodate a threaded stud 86 which has a stud head 87 on one end thereof, secured to the adjustable table top 51 by means of screws 90.

It will be seen that by rotating the sprocket 75, the threaded stud 86 will be moved axially according to the directional of rotation of the sprocket 75. The four threaded studs 86, in their respective elevating sprocket assemblies, are so positioned in relation to the adjustable table top 51 and the table base plate 39, that simultaneous movement or rotation of all of the sprocket wheels 75 by rotation of the endless link chain in the proper direction, will cause the adjustable table top 51 to have the four corners thereof elevated simultaneously.

The threaded studs 86 are initially positioned so that the upper and lower plates of the table adjustable portion are parallel to each other. The adjustable table top 51 may be raised or lowered to bring it into alignment with the upper surface of the cutting board portion 30 by turning the control sprocket assembly 62.

The control sprocket assembly 62 is shown in Fig. 4 wherein the adjustable table top 51 has a wrench opening 95 therein to receive the sprocket wrench 96 shown in phantom. The sprocket assembly 62 has comparable parts to those shown in Fig. 3, and are given the same numbers. However, a head 97 formed on the end of the sprocket wheel 75 is square in cross-sectional shape to receive the sprocket wrench.

Fig. 5 shows details of one of the take-up sprocket assemblies such as 64. A lower plate 98 has an elongated slot 99 therein for receiving headed fastening screws 100 for adjustably fastening the lower plate of the take-up sprocket assemblies to the base plate 39 of the table adjustable portion 33.

The lower plate 98 has secured thereto, such as by a weld 101, an upper plate 102 which is L-shaped. The upper plate 102 and the lower plate 98 have bearing openings such as 103 and 104 respectively, for receiving shafts 105 and 106 having hubbed portions 107 and 108, respectively, of the take-up sprocket 14, the sprocket 14 is otherwise similar in contour to, but somewhat smaller than the sprockets 75 of the elevating sprocket assemblies.

From the foregoing, it will be seen that by rotating the sprocket wrench in either one direction or the other, the adjustable table top 51 may be lowered to the dotted portion position shown in Fig. 3 or elevated to the solid line position shown in Fig. 3, and the flexible closure 50 will be yieldable in accordance with the movement of the table top in relation to the base plate 45.

In Fig. 2 it will be seen that the flexible closure 50 has closure securing strips 53 on the four sides of the table base plate so that the mechanism for elevating the adjustable table top is completely enclosed by the resilient or flexible closure 50.

Also, it will be seen that the table adjustable portion 33 has an adjustable table top which may be lowered after the cutting board portion has been resurfaced or cut down, in order to keep the entire surface at an even level. The apparatus permits repeated resurfacing of the cutting board portion after mutilation by a cutting die 108 such as is shown on top of a ream of the paper 109, or other material to be cut by the die.

While a specific embodiment of the invention has been shown and described in detail to illustrate the application of the invention principles, it will be understood that the invention may be embodied otherwise without departing from such principles.

What is claimed as new and desired to be secured by Letters Patent of the United States is:

1. A die press for cutting sheet material comprising a vertically reciprocable ram member, a base member below said ram, said base including cutting board supporting means, and a cutting board slidably mounted on said supporting means, said cutting board comprising a wooden block cutting portion of substantial area and a vertically reciprocatable work supporting surface portion forming the remaining area attached to the wooden block portion, said wooden block surface being capable of being planed evenly after wear due to the cutting of work thereon by said die press, and means to reciprocate said work supporting surface portion to affect realignment thereof with said wooden block cutting surface portion after the latter is planed.

2. In combination with a die press according to claim 1, wherein said means to reciprocate said work supporting surface portion includes an internally threaded sprocket member rotatably mounted on said cutting board supporting base and a threaded stud in engagement with the internal threads of said sprocket member and connected to said reciprocatable work supporting surface portion, said threaded stud being reciprocated upwardly and downwardly upon rotation of said sprocket member.

3. In combination with a die press according to claim 1, including a sprocket member adjacent each of the corners of said reciprocatable work supporting surface portion, said sprocket member having an internally threaded central portion, a threaded stud member in engagement with the threaded portion of said sprocket member and connected to said work supporting surface portion, and means for simultaneously rotating each of said sprocket members whereby to evenly raise and lower said work supporting surface portion.

4. In combination with a die press according to claim 3, wherein said means for simultaneously rotating each of said sprocket members includes a sprocket chain extending around each of said sprocket members, and a crank sprocket member in engagement with said chain, said crank sprocket member including means for connecting a crank thereto for rotating said member.

5. In combination with a die press according to claim 4, wherein said work supporting table includes an opening therein in alignment with the portion of said crank sprocket member for connection to a crank member, whereby a crank member may be positioned in said opening to change the elevation of said work supporting surface portion.

6. A die press for cutting sheet material comprising a base member, a vertically reciprocable ram member arranged above said base, and table means movable between said base and said ram, said table means comprising a supporting base, and a cutting board portion and a work supporting vertically adjustable portion supported on said base, said cutting board portion being capable of being planed evenly after wear such as would occur when said die press cuts a sufficient number of work pieces thereon, and means to reciprocate said work supporting surface portion to affect realignment thereof with said cutting board portion after the latter is planed.

7. A die press according to claim 6, wherein said means to reciprocate said work supporting surface is located between said supporting base and said work supporting surface, and including a flexible covering extending between said base and said work supporting surface adjacent the exposed sides thereof to cover said reciprocating means.

References Cited in the file of this patent

UNITED STATES PATENTS

| | | |
|---|---|---|
| 499,050 | Stewart et al. | June 6, 1893 |
| 1,082,669 | Winkley | Dec. 30, 1913 |
| 1,106,363 | Casgrain | Aug. 11, 1914 |

FOREIGN PATENTS

| | | |
|---|---|---|
| 196,960 | Switzerland | Apr. 15, 1938 |